(12) United States Patent
Johnson

(10) Patent No.: US 11,302,206 B2
(45) Date of Patent: Apr. 12, 2022

(54) TEACHING SOCIAL SKILLS USING A CUSTOMIZED INTERACTIVE MODEL

(71) Applicant: Andrea Facer Johnson, South Jordan, UT (US)

(72) Inventor: Andrea Facer Johnson, South Jordan, UT (US)

(73) Assignee: Teaching It Right, LLC, South Jordan, UT (US)

( * ) Notice: Subject to any disclaimer, the term of this patent is extended or adjusted under 35 U.S.C. 154(b) by 0 days.

(21) Appl. No.: 14/994,979

(22) Filed: Jan. 13, 2016

(65) Prior Publication Data

US 2016/0203725 A1 Jul. 14, 2016

Related U.S. Application Data

(60) Provisional application No. 62/103,431, filed on Jan. 14, 2015.

(51) Int. Cl.
*G09B 5/06* (2006.01)

(52) U.S. Cl.
CPC .................................. *G09B 5/065* (2013.01)

(58) Field of Classification Search
CPC .......... G09B 19/00; G09B 5/065; G09B 5/04; G09B 5/06
See application file for complete search history.

(56) References Cited

U.S. PATENT DOCUMENTS

| | | | | |
|---|---|---|---|---|
| 5,813,863 A | * | 9/1998 | Sloane | G09B 5/065 434/236 |
| 2006/0007243 A1 | * | 1/2006 | Miller | G11B 27/034 345/619 |
| 2008/0281868 A1 | * | 11/2008 | Gutstein | G06Q 10/00 |
| 2011/0159471 A1 | * | 6/2011 | Su | G09B 5/06 434/308 |
| 2012/0036455 A1 | * | 2/2012 | Holt | G06F 3/0482 715/753 |

* cited by examiner

*Primary Examiner* — Nathan Hillery
(74) *Attorney, Agent, or Firm* — Michael F. Krieger; Kirton McConkie

(57) ABSTRACT

Social skills can be taught using a customized interactive model. As part of this model, an Autism Spectrum Disorder (ASD) individual and an influencer are involved in creating customized content that will later be presented to the individual as part of an interactive game or other learning environment. This customized content includes both visual and audio content of the individual and the influencer and other graphical content selected and/or customized by the individual. One problem faced when teaching individuals is that they do not instantaneously connect noises with sources or relate words they hear with the speaker. By involving the individual in the creation of the customized content, the likelihood that the individual will make such connections can be increased since the individual is more likely to recognize content that he or she created in conjunction with an influencer.

12 Claims, 1 Drawing Sheet

TEACHING SOCIAL SKILLS USING A CUSTOMIZED INTERACTIVE MODEL

CROSS-REFERENCE TO RELATED APPLICATIONS

This application claims the benefit of U.S. Provisional Patent Application No. 62/103,431 which was filed on Jan. 14, 2015.

BACKGROUND

Autism Spectrum Disorder (ASD) refers to a range of conditions that are classified as neuro-developmental disorders. ASD encompasses autism, Asperger syndrome, pervasive developmental disorder not otherwise specified (PDD-NOS), childhood disintegrative disorder, and Rett syndrome. One common characteristic of these disorders is the inability to display common social skills when interacting with others. For example, most individuals with ASD struggle to make or maintain eye contact when interacting with another individual.

Various tools and techniques have been developed to assist ASD individuals to develop or improve their social skills. These tools and techniques typically employ a group-based approach where members of the group participate in role-playing activities which reinforce desired social skills. Although beneficial, these group-based approaches can be improved.

BRIEF SUMMARY

The present invention extends to methods, systems, and computer program products for teaching social skills using a customized interactive model. As part of this model, an individual and an influencer are involved in creating customized content that will later be presented to the individual as part of an interactive game or other learning environment. This customized content includes both visual and audio content of the individual and the influencer and other graphical content selected and/or customized by the individual. Instruments played in the background provide a beat to which individuals may be selected to synchronize movements. Some individuals respond to this by showing an increased focus when listening to the song that they helped create. They hear the beat, see a photo and then touch the picture in synchronization with the beat. This can be increased in difficulty by increasing the rhythm and/or asking them to touch with their right hand on the beat and the left hand on the fourth beat.

Optionally, an individual may be instructed to touch their picture on the screen on the nose or eye when they hear that word in the song. In another embodiment, the eyes in the photo may blink when the word "eyes" is mentioned in the song. The individual may be instructed to touch the moving part the next time they hear it after they moved. This integrates senses. The individual or the influencer or both may also have their voice recorded giving themselves encouragement which is replayed when they are successful. This reinforces the individual's development of social skills by reinforcing successful responses.

Audio content includes voices, instruments, and synthesized sound.

To assist in creating the customized audio content, demonstration videos are provided with indications where the individual's voice and the influencer's voice are to be introduced. Demonstration videos are also included showing how to take a photo and place it into the audio/video presentation and other segments designed to help make the production of the audio/video presentation. This speeds the creation of the customized audio/video presentations.

The selection of songs and rhythms is made taking into consideration the aptitude of the individual and some slower rhythms may be more beneficial to some individuals.

One problem faced when teaching individuals is that they do not instantaneously connect noises with sources or relate-words they hear with the speaker. By involving the individual in the creation of the customized content, the present invention can increase the likelihood that the individual will make such connections since the individual is more likely to recognize content that he or she created in conjunction with an influencer.

In one embodiment, the present invention is implemented as a method for generating a game that includes custom content for teaching social skills by utilizing a computing device for generating a first video or audio segment created by both an adult influencer and a child for rewarding the same child and a second audio or video segment to be used to teach the child and allow the child to practice social skills. The method comprises creating a first customized unique video content and a first customized audio content using software, the software combined with the first customized unique video content and the first customized audio content forms a first audio or video segment, in order to guide the adult influencer and the child. The first audio or video segment presents encouraging messages recorded by the adult influencer with the child for later presentation when the child reaches a benchmark or is successful in completing a portion of a training segment and if the child does not reach the benchmark, he or she is not presented. Audio input is received from an influencer of an individual. The audio input comprises the singing of a song having lyrics that teach a social skill. The method further comprises creating a photograph of the adult influencer and background sound track using the software which when combined form a second customized unique audio or video content segment, and the photograph to be intermittently displayed digitally at a time dictated by the beat of the background sound track. The child is instructed to touch an appropriate part of the photograph corresponding to the portrayed social skill before the photograph is no longer displayed. One or more photographs of the influencer that portray the social skill are received. The one or more photographs are then presented to the individual while the audio input is also presented. The method further comprises receiving through the computing device, the first audio or video segment and the second audio or video segment, lyrics, music and instruments that teach the portrayed social skill, such as making eye contacts when talking or listening, identifying facial expressions, using proper volume when speaking, maintaining a proper distance and using appropriate touching. Input is received from the individual that selects a portion of at least one of the one or more photographs. The method further comprises measuring the child's performance using the computing device, as the child views the second customized unique audio or video segment to record the number of times, the child accurately identifies the portrayed social skill by touching the photograph at a location corresponding to the desired social skill and depending on which predetermined level of skill is reached. The input comprises an identification of the portrayed social skill. An indication of the identification of the portrayed social skill is then stored. The method further comprises, at last, rewarding the child by playing the first audio or video segment for a reward level of skill and other rewards for reaching other levels of skill.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
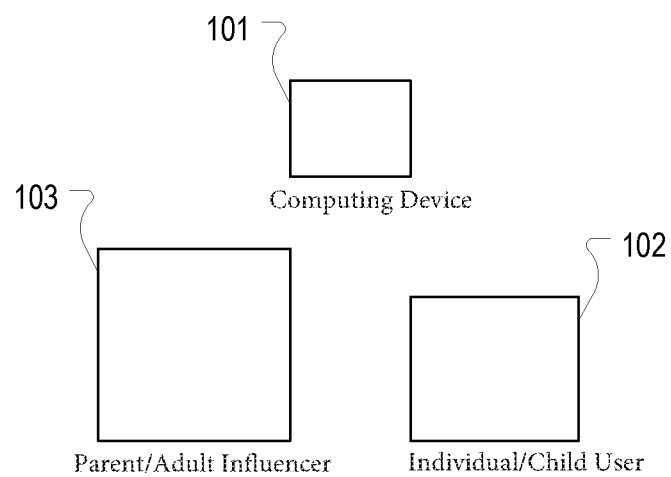
FIG. 1 illustrates an example environment in which the present invention can be implemented.

Embodiments of the present invention may comprise or utilize special purpose or general-purpose computers including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention focusses on a method for generating a game that includes custom content for teaching social skills by utilizing a computing device for generating a first video or audio segment created by both an adult influencer and a child for rewarding the same child and a second audio or video segment to be used to teach the child and allow the child to practice social skills. The method comprises creating a first customized unique video content and a first customized audio content using software, the software combined with the first customized unique video content and the first customized audio content forms a first audio or video segment, in order to guide the adult influencer and the child, at first step. The method further comprises creating a photograph of the adult influencer and background sound track using the software which when combined form a second customized unique audio or video content segment, and the photograph to be intermittently displayed digitally at a time dictated by the beat of the background sound track, at second step. The child is instructed to touch an appropriate part of the photograph corresponding to the portrayed social skill before the photograph is no longer displayed. The method further comprises receiving through the computing device, the first audio or video segment and the second audio or video segment, lyrics, music and instruments that teach the portrayed social skill, such as making eye contacts when talking or listening, identifying facial expressions, using proper volume when speaking, maintaining a proper distance and using appropriate touching, at third step. The method further comprises measuring the child's performance using the computing device, as the child views the second customized unique audio or video segment to record the number of times, the child accurately identifies the portrayed social skill by touching the photograph at a location corresponding to the desired social skill and depending on which predetermined level of skill is reached, at fourth step. Lastly, the method further comprises, at last, rewarding the child by playing the first audio or video segment for a reward level of skill and other rewards for reaching other levels of skill, at fifth step.

The first audio or video segment content includes a portion of a song that is sung by the influencer and a portion of a song that is sung by the child. The photographs which are displayed as described in one of the steps of the method are presented intermittently by moving the photograph up and down as it is displayed. The second audio or video segment is animated.

FIG. 1 illustrates an example environment 100 in which the present invention can be implemented. Environment 100 includes a tablet computing device 101 that can be used by an individual 102 and an influencer 103 to create customized content for use in an interactive game or other learning environment (hereinafter "game"). Although a tablet computing device will be used as an example in this specification, it is to be understood that any computing device can be used to implement embodiments of the present invention.

In this specification, an influencer should be interpreted as any individual that assists the individual in learning desired social skills. However, it is preferred that the influencer is an individual with whom the individual has a close personal relationship such as, for example, a parent, guardian, or teacher. An individual should be interpreted as including any individual that is attempting to learn and/or improve a social skill including individuals with one or more of the disorders classified within ASD (or ASD individuals).

The term social skill should be construed broadly to encompass any desirable social behavior. This invention can also be used with non-autistic individuals to teach social skills.

To motivate individuals to use the system a reward is offered. This reward is presented in the form of a video of the influencer announcing the reward, for example a trip to get an ice cream, play a game, or another customized activity to reward the individual.

Examples of social skills include making eye contact when talking, listening when being spoken to, identifying facial expressions of others (e.g., happy, sad, surprised, or angry faces), identifying facial expressions of self (e.g., identifying when a happy, sad, surprised, or angry face is appropriate), using the proper volume when talking (e.g., when to whisper or use a loud voice), maintaining the proper distance when talking (e.g., arm's length when talking or hand's length when whispering), and using proper touch (e.g., when it is appropriate to hug or shake hands). Additional examples of social skills, which, in some embodiments, may be learned after a number of basic skills have been mastered include: learning how to greet someone, learning how to introduce one's self, learning how to introduce others, learning how to ask a question, learning how to give a compliment, learning how to stay on topic, and learning how to wait patiently until an appropriate time to talk, active listening, correct postures, learning how to answer a question, learning how to acknowledge an answer and other identified social skills.

Tablet computing device 101 can include software for prompting individual 102 and influencer 103 to provide input to create customized content, and for receiving such input. Then, once the customized content is created, the software can present a game to individual 102 which employs the customized content to assist individual 102 in developing desired social skills.

The customized content can preferably include both audio and visual content of the individual and the influencer. In some embodiments, the present invention can prompt the influencer and individual to provide photographs of the influencer and individual which illustrate a desired social skill. For example, if the desired social skill is eye contact, various photographs of the individual and/or the influencer which illustrate eye contact can be provided (e.g., a photograph of the individual looking at the eyes of the influencer or a photograph of the influencer's eyes). If tablet computing device 101 includes a camera, the present invention can prompt the individual and influencer to take the photographs using the tablet computing device. Otherwise, the photographs can be provided from another source. Different photographs may be obtained for the different social skills that are to be taught. The present invention can display examples of the desired photographs to assist the influencer and individual in taking and/or providing photographs of themselves that portray the desired social skill.

If an individual achieves a benchmark after the five day intervention, they will receive reminder segments up to a year later or at an interval customized for their needs. If they fail to reach a benchmark such as a percentage of eye contact for example then they will receive the review segment at a shorter interval such as weeks later.

In some embodiments, the present invention can also prompt the influencer and/or individual to sing a song so that the song can be recorded for use during the game. Using the eye contact example as the desired social skill, the present invention can prompt the influencer and individual to sing a song about making eye contact. In some embodiments, the influencer may be prompted to sing a first verse and the chorus while the individual may be prompted to sing a second verse and possibly the chorus. In cases where the individual is unwilling or unable to sing, the influencer may sing all portions of the song or may sing the individual's part with the individual. Different songs may be recorded for the different social skills to be taught.

In some embodiments, the method further comprises receiving input from the child for customizing an avatar that represents the child and for customizing an avatar that represents the influencer. The child's avatar is displayed interacting with the influencer's avatar in a manner that portrays the social skill and input is received from the child that identifies the portrayed social skill. The avatars are displayed on a location on a map. The child has autism spectrum disorder (ASD).

In some embodiments, the present invention can also prompt the individual to build an avatar to represent himself or herself as well as to build an avatar to represent the influencer. Involving the individual in building the avatars can increase the likelihood that the individual will identify that the avatars represent the individual and the influencer.

In some embodiments, the present invention can present a game to the individual that includes various levels where each level teaches a particular social skill. The process of creating custom content can be performed prior to commencing the game or prior to commencing a particular level during which the custom content will be used. For example, the present invention can guide the influencer and individual through the process of creating custom content for a level of the game that teaches eye contact prior to allowing the individual to play that level while allowing the influencer and individual to create custom content for other levels at a later time.

Each level of a game can include a learning portion during which the individual learns the social skill and a practice portion during which the individual practices the social skill. During the game, the individual's avatar can be displayed to represent the individual within the game. For example, if die game involves travelling to various locations on a map, the individual's avatar can be shown as travelling to the various locations. In such embodiments, a particular social skill can be practiced at each location on the map.

During the learning portion of a level, the song that the influencer and possibly the individual recorded can be played to the individual. As stated above, the lyrics of the song can describe the desired social skill that is being taught at the current level. In some embodiments, the song may be played back slowly to ensure that the lyrics can be understood. While the song is played, the photographs of the influencer and/or individual which model the desired social skill can also be displayed. These photographs can be moved up and down slowly and subtly to the rhythm of the song. This movement of the photographs can cause the individual to move his or her head which can increase the individual's ability to learn in some instances. As the photographs are displayed, the individual can be prompted to provide touch input (e.g., by touching the eyes of the influencer when a photograph of the influencer is displayed). This touch input can serve as the basis for determining whether the individual has learned the desired social skill.

The use of the custom content in this manner creates a multi-sensory approach for teaching the desired social skill. In other words, while playing the game, the individual will employ visual, hearing, and tactile skills to practice the desired social skill. The effectiveness of this multi-sensory approach is enhanced due to the fact that the individual was involved in creating the customized content. For example, because of the close relationship that should exist between the individual and the influencer, the individual is more likely to associate the influencer's voice in the song with the photographs that include the influencer portraying the desired social skill. This association can increase the individual's ability to learn the desired social skill. In contrast, in group learning environments, such relationships typically do not exist thereby limiting the effectiveness of learning in such environments.

This learning portion can be repeated until the individual has exhibited sufficient mastery of the desired social skill. For example, if the social skill is eye contact, it can be determined whether the individual has touched the eyes of the influencer in a certain number of the displayed photographs. Once the individual has exhibited sufficient mastery, the game can progress to the practice portion for that level.

The practice portion can employ the avatars for the individual and the influencer in a fun activity that will reward the individual for successfully completing the learning portion. For example, the practice portion can depict the individual's avatar exploring a particular location on a map where the avatar is involved in a race to collect various items. The movement of the avatar during the race or other activity can be based on the song for that level, but without the recorded lyrics.

At the end of the practice portion, the ASD's avatar can meet the influencer's avatar, and the two avatars can depict the desired social skill while prompting the individual to provide input to identify the desired social skill. For example, if the social skill is eye contact, the individual can be prompted to touch the eyes of the influencer's avatar while the individual's avatar is looking at the eyes. This additional practice can reinforce the social skill that was learned in the corresponding learning portion.

In some embodiments, the present invention can require the individual to complete the current level a number of times prior to moving on to the next level. For example, if the present invention is implemented in a school setting, the individual can be required to complete the learning and practice portions for a particular social skill on each day of a particular week. This repetition can reinforce the learned social skill.

In some embodiments, the game can include a level for each of a number of social skills including, for example, a level for each of: making eye contact when talking, listening when being spoken to, identifying facial expressions of others, identifying facial expressions of self, using the proper volume when talking, maintaining the proper distance when talking, and using proper touch. As stated above, for each of these levels, the individual and influencer can record a song with lyrics that teach the desired social skill and take or submit pictures of themselves that portray the desired social skill.

In some embodiments, the game may include a review portion that the individual plays after completing some or all of the levels in the game. In the review portion, the individual can be presented with a number of scenarios that each depicts one or more desired social skills using the avatars of the individual and the influencer. After viewing a scenario, the game can prompt the individual to correctly identify which social skills were being portrayed. If the individual fails to correctly identify a particular social skill that is portrayed, the game can return to the learning portion of the level that taught the particular social skill and then present the scenario again to the individual. If the individual again fails to correctly identify the particular social skill, the game can require the individual to practice the level corresponding to the particular social skill for a number of days.

In a particular implementation of the present invention, the practice portion of each level of the game can involve a race around the world. In such an implementation, the individual's avatar can be displayed on a map at a particular location where a particular social skill is taught. Selecting the avatar while at a particular location on the map can cause the learning portion of the corresponding level to be presented to the individual. Upon completion of the learning portion, the practice portion can be presented as a number of activities that are performed at the particular location. For example, if the particular location is a famous landmark, the individual's avatar can be shown engaging in activities (e.g., collecting coins) at or around the famous landmark. As stated above, as the avatar engages in these activities the song recorded for the corresponding level can be played as background music but without the recorded lyrics. The progression of the activities can proceed in sequence with the background music.

In some embodiments, the individual's avatar can be given the opportunity to collect an item that is particular to the location such as an animal that resides in the location. This item can represent the learned social skill for that level. For example, a bird can be used to represent the eye contact social skill. The collection of such items can act as positive reinforcement for learning the associated social skill.

As stated above, at the end of the practice portion, the individual's avatar can meet up with the influencer's avatar where the corresponding social skill will again be portrayed along with a prompt for the individual to correctly identify the portrayed social skill. If the individual correctly identifies the social skill, the avatar can receive a stamp or other indication in a travel book to indicate that the location has been completed. The individual's avatar can then move to a new location on the map where the same social skill or another social skill will be taught and practiced. For example, a particular level of the game can be repeated at a number of different locations (e.g., five locations) so that the skill can be repetitively taught and practiced in different settings. In some embodiments, after the skill has been completed at each of the number of locations, a medal can be awarded as evidence that the skill has been mastered.

In some embodiments, the game can be structured to include a number of different units. A first unit can function as described above with the individual's avatar interacting with the influencer's avatar. In a second unit, the individual can play the practice portion of the game, but instead of interacting with the influencer's avatar, the individual's avatar can interact with the avatars of other known individuals (e.g., those of students in the same school as the individual) to practice the social skills. In a third unit, the individual's avatar can interact with the avatars of unknown individuals. Different skills or variations of a skill may be taught in different units. For example, in the first unit, the individual may learn to identify happy and sad faces while in the second unit, the individual may learn to identify surprised and angry faces.

In some embodiments, various types of tracking tools can be provided to parents, guardians, or teachers to assist them in providing information about the progress of the individual. As one example, a mobile application can be provided which includes a timer that can be used to track duration of time during which the individual is demonstrating a social skill that is being learned. For example, a parent may start the timer when the individual starts demonstrating the social skill (e.g., starts making eye contact) and then stop the timer when the individual stops demonstrating the social skill (e.g., stops making eye contact). The total amount of time that the individual demonstrates the skill can be determined in this manner In some embodiments, this timer can be used during a specified duration of time so that the total percentage of time during which the individual is demonstrating the desired skill can be generated. The mobile application can report the timer information back to server system 101 to allow the information to be presented in conjunction with an account of the individual. This information can also be used to generate a count of the number of times that the individual demonstrates the desired skill.

In some embodiments of the present invention, the game can be configured to require ten minutes or less each day while also requiring repetition for a number of days such as five. By limiting the duration of the game, the individual may be better able to learn a desired skill without feeling overloaded. The repetition of the same skill over a number of days can further reinforce the learned skill.

The method as disclosed in the present invention is preferably practiced five minutes each day, but is not intended to restrict to the same, and can be practiced only ten minutes or fifteen minutes each day and so on.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for teaching social skills by utilizing a computing device for generating a first audio/video segment that includes custom content created by both an adult influencer and a child for rewarding the same child, and a second audio/video segment to be used to teach the child and allow the child to practice basic social skills, the method comprising:
    using software that guides an adult influencer and a child through the process of creating a first customized unique video content and a first customized audio content which when combined by the software forms a first audio/video segment which presents encouraging messages recorded by the adult influencer with the child for later presentation when the child reaches a benchmark or is successful in completing a portion of a training segment and if the child does not reach a benchmark is not presented;
    using software that creates a photograph of the adult influencer and a background sound track which when combined form a second customized, unique audio/video segment, the child being instructed to touch an appropriate part of the photograph corresponding to the portrayed social skill before the photograph is no longer displayed;
    receiving, through a computing device, the first audio/video segment and the second audio/video segment; lyrics, music and instruments that teach a portrayed social skill, such as making eye contact when talking or listening, identifying facial expressions, using proper volume when speaking, maintaining a proper distance and using appropriate touching;
    presenting to the child, via the computing device, the second audio/visual segment;
    and
    rewarding the child for a reward level of skill.

2. The method of claim 1, wherein the second audio/video segment content is also selected by the child.

3. The method of claim 2, wherein the first audio/video segment content includes a portion of a song that is sung by the influencer and a portion of a song that is sung by the child.

4. The method of claim 1, wherein the photograph is also of the child.

5. The method of claim 1, wherein presenting the intermittently displaying photographs comprises moving the photograph up and down as it is displayed.

6. The method of claim 1, further comprising:
    receiving input from the child for customizing an avatar that represents the child and for customizing an avatar that represents the influencer.

7. The method of claim 6, further comprising:
    displaying the child's avatar interacting with the influencer's avatar in a manner that portrays the social skill; and
    receiving input from the child that identifies the portrayed social skill.

8. The method of claim 7, wherein the avatars are displayed on a location on a map.

9. The method of claim 1, wherein the child has Autism Spectrum Disorder (ASD).

10. The method of claim 1, wherein the method is practiced five minutes each day.

11. The method of claim 1, wherein the method is practiced only ten minutes each day.

12. The method of claim 1, wherein the method is practiced only fifteen minutes each day.

* * * * *